United States Patent [19]
Wawra et al.

[11] 3,800,589
[45] Apr. 2, 1974

[54] CIRCUIT ARRANGEMENT FOR ADJUSTING THE POSITION OF A MOVABLE MEMBER

[75] Inventors: Carl Martin Wawra, Bensheim-Auerbach; Ivan Chudey, Ober-Ramstadt, both of Germany

[73] Assignee: Finona Carl Schenck Maschinenfabrik GmbH, Darmstadt, Germany

[22] Filed: Mar. 27, 1972

[21] Appl. No.: 238,579

[30] Foreign Application Priority Data
Mar. 20, 1972  Germany............................ 2213436

[52] U.S. Cl. .................................................. 73/90
[51] Int. Cl. ............................................. G01n 3/00
[58] Field of Search ............... 73/89, 90, 91, 92, 93, 73/95, 97, 103

[56] References Cited
UNITED STATES PATENTS
3,712,125  1/1973  Meyer..................................... 73/90
3,140,601  7/1964  Weyland et al........................ 73/89

OTHER PUBLICATIONS
Pelloux et al., Review of Scientific Instruments, Vol. 35, No. 11, Nov. 1964, pp. 1564–1567.

*Primary Examiner*—Charles A. Ruehl
*Attorney, Agent, or Firm*—W. G. Fasse

[57] ABSTRACT

The present circuit arrangement for adjusting a movable member, for example, for controlling the movement of a chucking head in a hydraulically driven material testing apparatus, comprises two serially arranged comparing stages in which actual and rated values are compared, whereby the output value of the first comparing stage is supplied as a rated value to one input of the next comparing stage the output of which regulates an adjustment control member such as a servo value whereby the movement of the movable member is stopped in response to a second actual value reaching or exceeding a second adjustable rated value.

5 Claims, 2 Drawing Figures

CIRCUIT ARRANGEMENT FOR ADJUSTING THE POSITION OF A MOVABLE MEMBER

BACKGROUND OF THE INVENTION

The present invention relates to a circuit arrangement for adjusting the position of a movable member, especially for material testing apparatus, such as a hydraulically driven testing machine. The present circuit arrangement monitors the movement of a movable member, for example, the chucking head in response to a predetermined rated value which may represent a displacement of the movable member or a force applied to the movable member. The present circuit arrangement is, for example, suitable for positioning the movable chucking head of a testing apparatus relative to the length of the probe to be tested.

In prior art testing machines, the material probe to be tested is usually chucked first only in one chucking head and thereafter the other movable chucking head is adjusted in such a manner that the probe may also be chucked in the other chucking head. This adjustment of the other or movable chucking head is accomplished as a displacement regulation control. However, such adjustment is rather time consuming and requires, especially in connection with delicate probes, a substantial experience on the part of the operator because in connection with the displacement control large forces may occur rapidly. Such forces may destroy the probe and damage the testing apparatus whereby even the operating personnel may be endangered. For example, the rated load of the testing apparatus may already be reached in connection with a rigid probe if during the adjustment of the spacing between the chucking head and the probe the chucking head has been moved by five millimeters too far whereby the probe may become tilted and/or the chucking head may be bent.

OBJECTS OF THE INVENTION

In view of the above, it is the aim of the invention to achieve the following objects, singly or in combination:

to overcome the above outlined drawbacks of the prior art by making the adjustment of the movable member more sensitive;

to improve the displacement control for the adjustment of the movable chucking head to the length of the probe in such a manner that damages to the probe or to the chucking heads themselves are avoided; and to move the movable member, for example, through a piston rod to a predetermined position in response to the breaking or destruction of the probe.

SUMMARY OF THE INVENTION

According to the invention there is provided a circuit arrangement for adjusting the position of a movable member in such a manner that the controlled movement in response to a first rated value is stopped when a second actual value reaches or exceeds a second adjustable rated value whereby the actual values as well as the rated values may be represented by electrical signals produced by sensing means in response to a displacement of the movable member or in response to a force applied to the movable member.

According to one embodiment of the invention there are provided two comparing control or regulating means. When the movable member, for example, the chucking head of a material testing apparatus is adjusted a first actual value and a first rated value are compared in the first regulating comparing device and a limiting circuit is arranged between the two comparing devices whereby to supply the output value of the first comparing device to a rated value input of the second comparing regulating device and whereby the second rated value is supplied to said limiter to determine the size of the pass range of said limiter circuit. The second comparing and regulating device receives at its actual value input the actual value signal ascertained in response to the force applied to the chucking head. The rated values may be represented by electrical signals corresponding to displacement values and/or force values.

According to a preferred embodiment of the invention, the first rated value supplied to the first comparing regulating means is a force representing signal and the second rated value is a displacement representing signal supplied to a control input of a limiter.

BRIEF FIGURE DESCRIPTION

In order that the invention may be clearly understood, it will now be described, by way of example, with reference to the accompanying drawings, wherein:

FIG. 1 is a block diagram of a first embodiment according to the invention illustrating the control of a hydraulically operating testing apparatus; and FIG. 2 illustrates a modification of the apparatus according to FIG. 1, wherein the movable member is displaced to a predetermined position in response to breaking of the probe.

DETAILED DESCRIPTION OF EXAMPLE EMBODIMENTS

Figure 1:
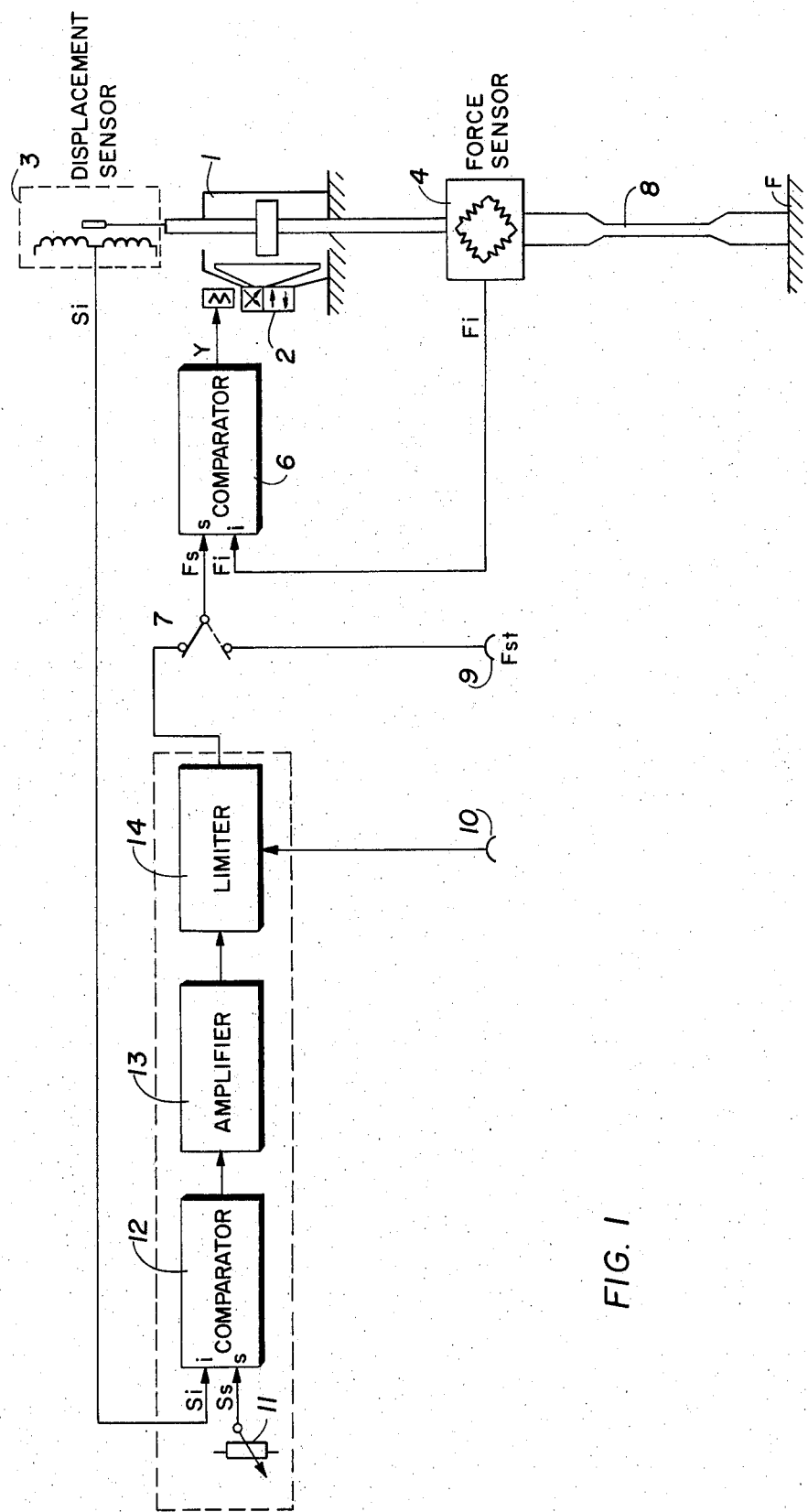
Figure 2:
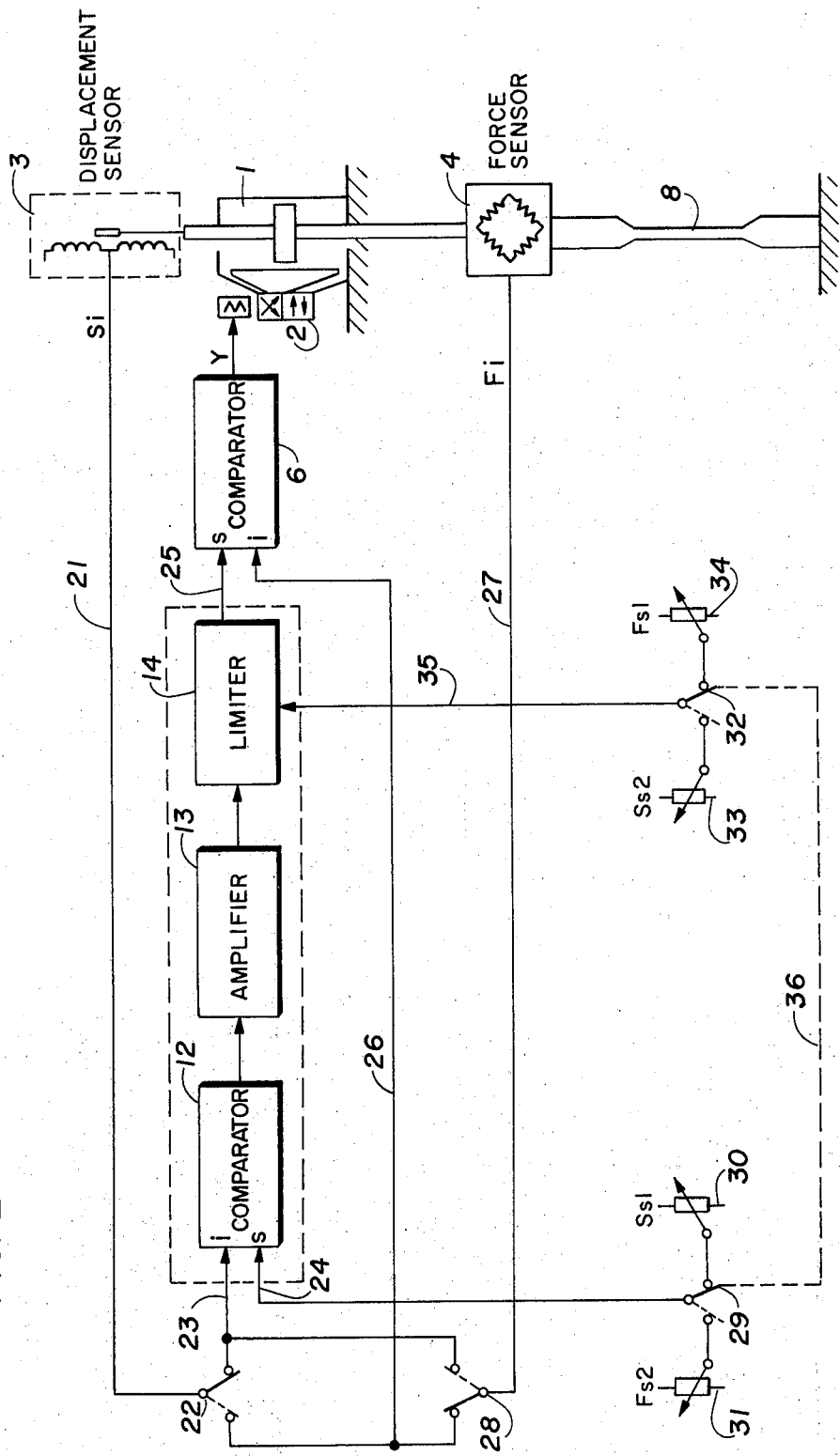

For simplicity's sake, the testing apparatus is shown schematically in FIGS. 1 and 2. A testing force is applied to the probe 8 by means of a hydraulic cylinder 1 which is controlled through a servo valve 2 connecting the cylinder 1 to a source of hydraulic power not shown. The servo valve 2 may be controlled through a solenoid by electrical signals. A force measuring gauge 4 is arranged between the piston rod of the cylinder 1 and the probe 8 to be tested. The force measuring gauge may also be arranged between the probe 8 and the frame structure F of the apparatus. The force measuring gauge 4 acts as a first sensing device which provides an electrical signal representing an actual force value.

A second sensing device 3 is arranged for cooperation with the piston rod to sense the displacement of the piston rod whereby to provide a displacement representing electrical signal or value which corresponds to the instantaneous actual position value of the piston rod. The displacement sensing device 3 is connected to an actual input value $i$ of a first comparing regulating means 12 for supplying the actual displacement value signal Si to the comparator 12. Rated value input means, for example, a potentiometer 11 is connected to the rated input s of the comparator 12 for supplying an adjustable rated signal value to the comparator 12. The output of the comparator 12 is connected to a control or regulating amplifier 13, the output of which in turn is connected to the input of a limiter stage 14. The limiter stage 14 has a control input 10 to which is applied a rated control signal for adjusting the pass range of the limiter to thus adapt the pass range to the individual requirement.

The output of the limiter 14 is connected through a single pole double throw switch 7 which actually may be an electronic switch to the rated value input s of the second comparing regulating device 6. In the shown rest position of the switch 7 the first and second comparing devices are connected to each other in series fashion. In the actuated dashed line position of the switch 7, the rated value input s of the comparator 6 is connected with an input terminal 9 to which is applied a force rated value signal Fs. The actual value input i of the comparator or regulator 6 is connected to the output of the force sensing device 4 whereby the actual force representing value or signal Fi is applied to the actual value input i of the comparator 6.

If there is a difference between the rated and actual value representing signals applied to the input of the comparator 6, a control signal Y is supplied to the solenoid of the servo valve 2. Thus, this control signal Y adjusts the valve 2 in such a manner that equality is established between the rated and actual signal values supplied to the inputs of the comparator 6.

The circuit arrangement according to FIG. 1 operates as follows. After the probe 8 has been chucked at one end thereof, the potentiometer 11 is adjusted to provide the rated value input signal Ss for the displacement required to also chuck the other end of the probe, that is, the potentiometer 11 is adjusted in accordance with the length of the respective probe. Since it may be assumed that the actual displacement signal value Si and the rated displacement signal value Ss do not correspond to each other, a difference voltage will be produced at the output of the comparator or regulator 12. The difference voltage is amplified in the control amplifier 13 and supplied to the input of the limiter 14. The limiter is adjusted through its control input 10 in such a manner that it passes a voltage corresponding to a force which, when applied to the probe will not result in any damage of the probe or of the chucking heads. The output value of the limiter 14 is then supplied as a rated force representing signal value Fs to the rated input s of the comparator 6. As long as the force measuring gauge 4 supplies an actual force representing value Fi = 0, the piston rod will be displaced in response to the rated force value Fs. As soon as the force sensing gauge 4 provides an actual force value Fi to the actual value input i of the second comparator 6, which actual force value corresponds to the rated force value Fs, the adjustment or displacement of the piston rod is stopped. The probe may now be chucked to the other chucking head. When the probe is properly chucked at both ends, the switch 7 is actuated to connect the input terminal 9 to the rated input of the comparator 6 in order to supply a rated test force signal Fst to the comparator. Accordingly, the probe 8 is now subjected to the test force in response to said test force signal.

FIG. 2 illustrates a modified embodiment according to the invention but employing the basic circuit elements according to FIG. 1. First, second, third and fourth switching means 22, 28, 29 and 32 are provided. These switching means have a single pole double throw function, however, they may be represented by electronic switching means well known in the art. With the aid of these switching means it is possible to switch from the displacement movement of the movable chucking head in response to the displacement control, to the adjustment movement of the piston rod to a predetermined position subsequent to the breaking of the probe 8. The elements which are the same in FIGS. 1 and 2 are provided with the same reference numerals. In the illustrated full line or rest position of the switching means 22, 28, 29 and 32, the actual displacement representing signal Si is applied through the conductor 21 and the switch 22 to the conductor 23 and thus to the actual value input of the comparator 12. Simultaneously, the rated value input of the comparator 12 is connected through the conductor 24 and the switch 29 to a rated displacement value supply means such as a potentiometer 30 which produces the rated displacement signal value Ss1. This rated displacement signal value Ss1 is adjustable by the potentiometer 30. As in FIG. 1, the comparator 12 is connected with its output to the input of a control amplifier 12 which in turn is connected with its output to a limiter circuit 14.

The limiter circuit 14 has a control input which is connected through the conductor 35 and the switch 32 to a potentiometer 34 by means of which a first rated force representing signal Fs1 may be adjusted. The output of the limiter 14 is connected through a conductor 25 to the rated input of the second comparator control device 6. The force actual value input of the comparator 6 is connected to the force sensing gauge 4 through the conductor 26, the switch 28 and the conductor 27.

In the actuated or dashed line position of the just mentioned switches, the situation is reversed, in other words, the actual displacement signal Si is supplied to the comparator 6 and the actual force representing signal Fi is supplied to the comparator 12. Moreover, the rated input of the comparator 12 is connected to the potentiometer 31 for adjusting a second rated force value Fs2, while the control input of the limiter 14 is connected to a potentiometer 33 for adjusting a second displacement representing rated value signal Ss2.

In the shown rest position of the switch means 22, 28, 29 and 32, the circuit according to FIG. 2 operates in the same manner as that of FIG. 1.

After the probe 8 has been chucked, the switching means 22, 28, 29 and 32 are changed into their actuated or dashed line position whereby the probe 8 is subjected to a respective force in accordance with a predetermined program. This force may be pre-adjusted by means of the potentiometer 31 which supplies the rated force value signal Fs2 which is supplied through conductor 24 to the rated value input of the comparator 12. As mentioned, the actual value input of the comparator 12 is connected to the force sensing gauge 4 through the dashed line position of the switch 8 and the conductor 27. Further, the displacement actual value Si is now supplied through the dashed line position of the switch 22 and the conductors 21 and 26 to the actual value input of the comparator 6. The control input of the limiter 14 is connected to the second rated displacement value Ss2 whereby the potentiometer 33 permits controlling the size of the pass range of the limiter 14. Incidentally, the switches 29 and 32 may be ganged as indicated by the dashed line 36 and as is well known in the art.

The circuit arrangement according to FIG. 2 operates as follows. The potentiometer 33 is adjusted to the second displacement rated value Ss2 to which the piston rod is to be displaced subsequent to breaking of the probe 8. The comparator control device 12 monitors the actual force value and the rated force value Fs2 so that the former corresponds to the latter. If a deviation occurs, a control signal Y is produced through the control amplifier 13, the limiter 14 and the regulating comparator 12 whereby the servo valve 2 is influenced in such a manner that the rated force is produced. Normally, the limiting effect of the limiter 14 does not occur. Similarly, the comparator control device 6 has initially no influence on the displacement or adjustment movement. However, as soon as the probe 8 breaks, a large difference occurs between the rated force value signal Fs2 and the actual force value signal Fi at the input of the regulating comparator 12. Accordingly, a large difference voltage is produced at the output of the comparator 12 which is supplied through the control amplifier 13 to the limiter 14 which now limits the difference voltage supplied to the input of the comparator 6 in accordance with the pre-adjusted displacement rated value Ss2. As long as the rated displacement value does not correspond to the actual displacement value, the piston rod is displaced in the direction toward achieving the desired value. When the rated displacement value and the actual displacement value correspond to each other, the difference voltage at the output of the regulator 6 disappears and accordingly, the movement of the piston rod is stopped.

Although in the example embodiments potentiometers have been shown for establishing the rated signal values such as the rated displacement signal value Ss1 and the rated force signal value Fs1 as well as the respective signals Ss2 and Fs2, other signal producing means may be employed. Moreover, instead of using separate potentiometers as shown, it is possible to use a common potentiometer for the displacement rated values and/or for the force rated values. These voltages may also be produced by any well known programming unit. Therefore, it is to be understood that it is intended to cover all modifications and equivalents within the scope of the appended claims.

What is claimed is:

1. A circuit arrangement for adjusting the position of a movable member to a predetermined position in accordance with a first rated value, comprising a position control means, first and second sensing means for ascertaining respective first and second actual values in response to the movement of said movable member, first and second comparing means, each having an actual value input and a rated value input, means for connecting the actual value input of said first comparing means to one of said sensing means and the actual value input of the second comparing means to the other sensing means, first rated value producing means connected to the rated value input means of the first comparing means, said first comparing means having an output connected to the rated value input of the second comparing means whereby a second rated value is applied to the rated value input of the second comparing means, the latter having an output connected to said position control means, said first comparing means comprising a comparator and a limiter stage connected between the comparator and the rated value input of the second comparing means, said limiter stage comprising a control input for receiving a rated control signal which determines the pass range of the limiter stage, whereby the controlled movement of the movable member in accordance with a rated value is stopped when the second actual value reaches or exceeds the second rated value, a rated value terminal, and switch means having a rest position connecting the rated value input of the second comparing means to an output of the first comparing means and an actuated position connecting said rated value terminal to the rated value input of said second comparing means.

2. A circuit arrangement for adjusting the position of a movable member to a predetermined position in accordance with a first rated value, comprising a position control means, first and second sensing means for ascertaining respective first and second actual values in response to the movement of said movable member, first and second comparing means, each having an actual value input and a rated value input, means for connecting the actual value input of said first comparing means to one of said sensing means and the actual value input of the second comparing means to the other sensing means, first rated value producing means connected to the rated value input means of the first comparing means, said first comparing means having an output connected to the rated value input of the second comparing means whereby a second rated value is applied to the rated value input of the second comparing means, the latter having an output connected to said position control means, whereby the controlled movement of the movable member in accordance with a rated value is stopped when the second actual value reaches or exceeds the second rated value, a limiter connected between said first and second comparing means and including a control input, first, second, third and fourth switch means each having a rest position and an actuated position, said first switch means connecting in its rest position said first actual value sensing means to the actual value input of the first comparing means and in its actuated position to the actual value input of the second comparing means, said second switch means connecting in its rest position said second actual value sensing means to the actual value input of the second comparing means and in its actuated position to the actual value input of the first comparing means, means for supplying first and second force representing rated values, means for supplying first and second displacement representing rated values, said third switch means connecting to the rated value input of the first comparing means in its rest position the first rated displacement value and in its actuated position the second rated force value, said fourth switch means connecting to the limiter control input in its rest position the first rated force value and in its actuated position the second rated displacement value.

3. The circuit arrangement according to claim 2, further comprising means for ganging said third and fourth switch means.

4. A circuit arrangement for adjusting the position of a movable member to a predetermined position in accordance with a first rated value corresponding to the displacements of said movable member, comprising a position control means, first and second sensing means for ascertaining displacement and force representing actual values respectively in response to the movement of said movable member, first and second comparing means each having an actual value input and a rated value input, means for connecting the actual value input of said first comparing means to said displacement sensing means and the actual value input of the second comparing means to said force sensing means, displacement rated value producing means connected to the rated value input means of the first comparing means, said first comparing means having an output connected to the rated value input of the second comparing means whereby a second rated value is applied to the rated value input of the second comparing means, the latter having an output connected to said position control means, said first comparing means comprising a comparator and a limiter stage connected between the comparator and the rated value input of the second comparing means, said limiter stage comprising a control input for receiving a rated control signal which determines the pass range of the limiter stage, whereby the controlled movement of the movable member in accordance with a rated value is stopped when said force actual value reaches or exceeds said second rated value.

5. The circuit arrangement according to claim 4, wherein said movable member is a chucking head in a hydraulically operated material testing apparatus.

* * * * *